(12) United States Patent
Yamada et al.

(10) Patent No.: US 9,964,408 B2
(45) Date of Patent: May 8, 2018

(54) STATE ESTIMATION DEVICE

(71) Applicant: Mitsubishi Electric Corporation, Tokyo (JP)

(72) Inventors: Tetsutaro Yamada, Tokyo (JP); Yoshiaki Yokoyama, Tokyo (JP); Yasushi Obata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/525,154

(22) PCT Filed: Nov. 20, 2014

(86) PCT No.: PCT/JP2014/080773
§ 371 (c)(1),
(2) Date: May 8, 2017

(87) PCT Pub. No.: WO2016/079848
PCT Pub. Date: May 26, 2016

(65) Prior Publication Data
US 2017/0314920 A1 Nov. 2, 2017

(51) Int. Cl.
*G01C 13/00* (2006.01)

(52) U.S. Cl.
CPC .................. *G01C 13/004* (2013.01)

(58) Field of Classification Search
CPC .... G01C 13/004; G01C 13/00; G01C 13/002; G01C 13/006; G01C 13/008
See application file for complete search history.

(56) References Cited

U.S. PATENT DOCUMENTS

2010/0315284 A1  12/2010  Trizna

FOREIGN PATENT DOCUMENTS

JP   2001-059869 A   3/2001
JP   2003-185743 A   7/2003
(Continued)

OTHER PUBLICATIONS

Zaid Sawlan, Tsunami Prediction and Earthquake Parameters Estimation in the Red Sea, Dec. 2012, Master of Science Thesis, Computer, Electrical and Mathematical Sciences and Engineering, Applied Mathematics and Computational Sciences, King Abdullah University of Science and Technology, Kingdom of Saudi Arabia, 50 pp.*

(Continued)

*Primary Examiner* — Toan Le
(74) *Attorney, Agent, or Firm* — Studebaker & Brackett PC

(57) ABSTRACT

An observer measures a flow velocity of sea surface with beam, and a coastal wave height. A predictor predicts a next time state vector, from a state vector including flow velocity of each range cell of beam, a wave height difference between range cells, and a coastal wave height. First calculator calculates a prediction error covariance matrix from a smoothing error covariance matrix. Second calculator calculates a gain matrix using results obtained by the observer and the first calculator. Third calculator calculates a smoothing error covariance matrix using results by the observer, the second calculator, and the first calculator. The state vector is smoothed for each wave height difference, from results by the observer, the predictor, and the second calculator. The wave height of each range cell is calculated by adding the wave height and the wave height difference in toward-offshore direction, using the wave height difference smoothing.

7 Claims, 5 Drawing Sheets

(56) References Cited

FOREIGN PATENT DOCUMENTS

| JP | 2003-307563 A | 10/2003 |
|----|---------------|---------|
| JP | 2005-003611 A | 1/2005 |
| JP | 2008-089316 A | 4/2008 |
| JP | 2009-229424 A | 10/2009 |
| JP | 2011-064677 A | 3/2011 |

OTHER PUBLICATIONS

International Search Report issued in PCT/JP2014/080773; dated Feb. 3, 2015.
Lipa et al.; "HF Rader Detection of Tsunamis"; Journal of Oceanography; vol. 62; pp. 705-716; 2006.
Breivik et al.; "Real time assimilation of HF radar currents into a coastal ocean model"; Journal of Marine Systems; vol. 28, Issues 3-4; pp. 161-182; Apr. 2001.
Izumiya et al.; "Study on Real-Time Prediction of Tsunami Using Ocean Surface Flow Velocity Field Obtained by Ocean Radar"; Proceedings of Coastal Engineering; vol. 52; pp. 246-250, 2005.
Koike; "Study on Real-Time Tsunami Forecasting and Warning That Uses Kalman Filter"; Journal of Japan Society of Civil Engineers No. 27-0293; 2003.

\* cited by examiner

STATE ESTIMATION DEVICE

TECHNICAL FIELD

The present invention relates to a state estimation device that performs state estimation of a sea surface.

BACKGROUND ART

It is required to accurately predict tsunami as fast as possible, for detecting tsunami at a far distance, and promptly giving an alarm. It is therefore necessary to recognize an accurate wave height value and an accurate flow velocity value of tsunami in real time. As countermeasures for this, the following inventions exist as prior arts. (For example, refer to Non-Patent Literatures 1 to 4 and Patent Literature 1.)

In the technique disclosed in Non-Patent Literature 1, a wave height value is predicted in real time from a flow velocity value obtained from a radar, using a nonlinear shallow water equation, which is a kinetic model of tsunami.

In the technique disclosed in Non-Patent Literature 2, a wave height value is predicted in real time by performing filtering of wave height values considering observation errors from wave height values of a tsunami gauge such as a global positioning system (GPS) buoy that is disposed from a coast toward an offshore.

In the technique disclosed in Patent Literature 1, a tsunami wave source is estimated based on a tsunami wave height observed at an observation position, and a tsunami wave height is estimated from the estimated tsunami wave source.

In the technique disclosed in Non-Patent Literature 3, detection of tsunami that uses an HF radar, and an equation of a relationship between a flow velocity and a wave height of tsunami that is based on a shallow water equation are described.

In the technique disclosed in Non-Patent Literature 4, a method of assimilating a flow velocity observation value of an HF radar with a tidal model is described as an estimation method of a flow velocity in a normal time when tsunami does not exist.

CITATION LIST

Non-Patent Literature

Non-Patent Literature 1: Izumiya, "Study on Real-Time Prediction of Tsunami Using Ocean Surface Flow Velocity Field Obtained by Ocean Radar", Proceedings of Coastal Engineering, Vol. 52, PP. 246 to 250.
Non-Patent Literature 2: Koike, "Study on Real-Time Tsunami Forecasting and Warning That Uses Kalman Filter", Journal of Japan Society of Civil Engineers No. 27-0293, 2003. Non-Patent Literature 3: BELINDA J. LIPA, DONALD E. BARRICK, JOHN BOURG and BRUCE B. NYDEN "HF Radar Detection of Tsunamis", Journal of Oceanography, Vol. 62, pp. 705 to 716, 2006
Non-Patent Literature 4: Oyvind Breivik, Oyvind Saetra, "Real time assimilation of HF radar currents into a coastal ocean model", Journal of Marine Systems, Volume 28, Issues 3-4, pages 161-182, April 2001.

Patent Literature

Patent Literature 1: JP 2008-089316 A

SUMMARY OF INVENTION

Technical Problem

However, in the technique disclosed in Non-Patent Literature 1, while a flow velocity value obtained by a radar includes an observation error, the observation error is not considered. Thus, as a problem of this technique, the accuracy of wave height prediction deteriorates. In addition, in this technique, there is also a problem that two or more radars are required to be installed (namely, it is assumed to obtain a flow velocity vector on a two-dimensional space).

In addition, in the technique disclosed in Non-Patent Literature 2, for detecting tsunami that may be originated from various orientations, a plurality of tsunami gauges needs to be installed on a two-dimensional space, so that there is a problem that the cost is high for installing the tsunami gauges. In addition, there is such an issue that, because a tsunami gauge such as a GPS buoy cannot directly observe a flow velocity value, a flow velocity value calculated from a wave height value on the basis of a motion equation of tsunami includes a significant error. In addition, there is also such an issue that, because a tsunami gauge using a GPS buoy cannot be installed on an offshore site far from land, only a wave height value of a sea around a coast can be identified.

In addition, also in the technique disclosed in Patent Literature 1, since it is assumed that the wave height value in an offshore site can be directly observed, there is a problem similar to the case of Non-Patent Literature 2.

In the case of calculating a wave height value from a flow velocity value based on the shallow water equation described in Non-Patent Literature 3, because an error of the flow velocity value is not considered, similarly to the case of Non-Patent Literature 1, there is such an issue that the estimation accuracy of the wave height value deteriorates.

In Non-Patent Literature 4, neither an estimation method of tsunami nor an estimation method of a wave height value of a sea surface is not described.

The present invention has been devised for solving the above-described problems, and an object of the present invention is to provide a state estimation device that can recognize an accurate wave height value and an accurate flow velocity value of tsunami in real time.

Solution to Problem

A state estimation device according to the present invention includes: an observation unit measuring a flow velocity value of a sea surface using a beam, and measuring a coastal wave height value; a prediction unit predicting, for a state vector including flow velocity value of each of range cells of the beam, a wave height difference between the range cells over a boundary thereof, and the coastal wave height value, the state vector at a next time; a prediction error covariance matrix calculation unit calculating a prediction error covariance matrix from a smoothing error covariance matrix; a gain matrix calculation unit calculating a gain matrix from processing results obtained by the observation unit and the prediction error covariance matrix calculation unit; a smoothing error covariance matrix calculation unit calculating a smoothing error covariance matrix from processing results obtained by the observation unit, the gain matrix calculation unit, and the prediction error covariance matrix calculation unit; a wave height difference smoothing unit smoothing the state vector for each wave height difference, from processing results obtained by the observation unit, the prediction unit, and the gain matrix calculation unit; and a wave height value calculation unit calculating a wave height value of each of the range cells by adding the wave height value and the wave height difference in a toward-offshore direction, using a processing result obtained by the wave height difference smoothing unit.

Advantageous Effects of Invention

According to the present invention, with the above-described configuration, an accurate wave height value and an accurate flow velocity value of tsunami can be recognized in real time.

DESCRIPTION OF EMBODIMENTS

An embodiment of the present invention will be described in detail below with reference to the drawings.

First Embodiment

Figure 1:
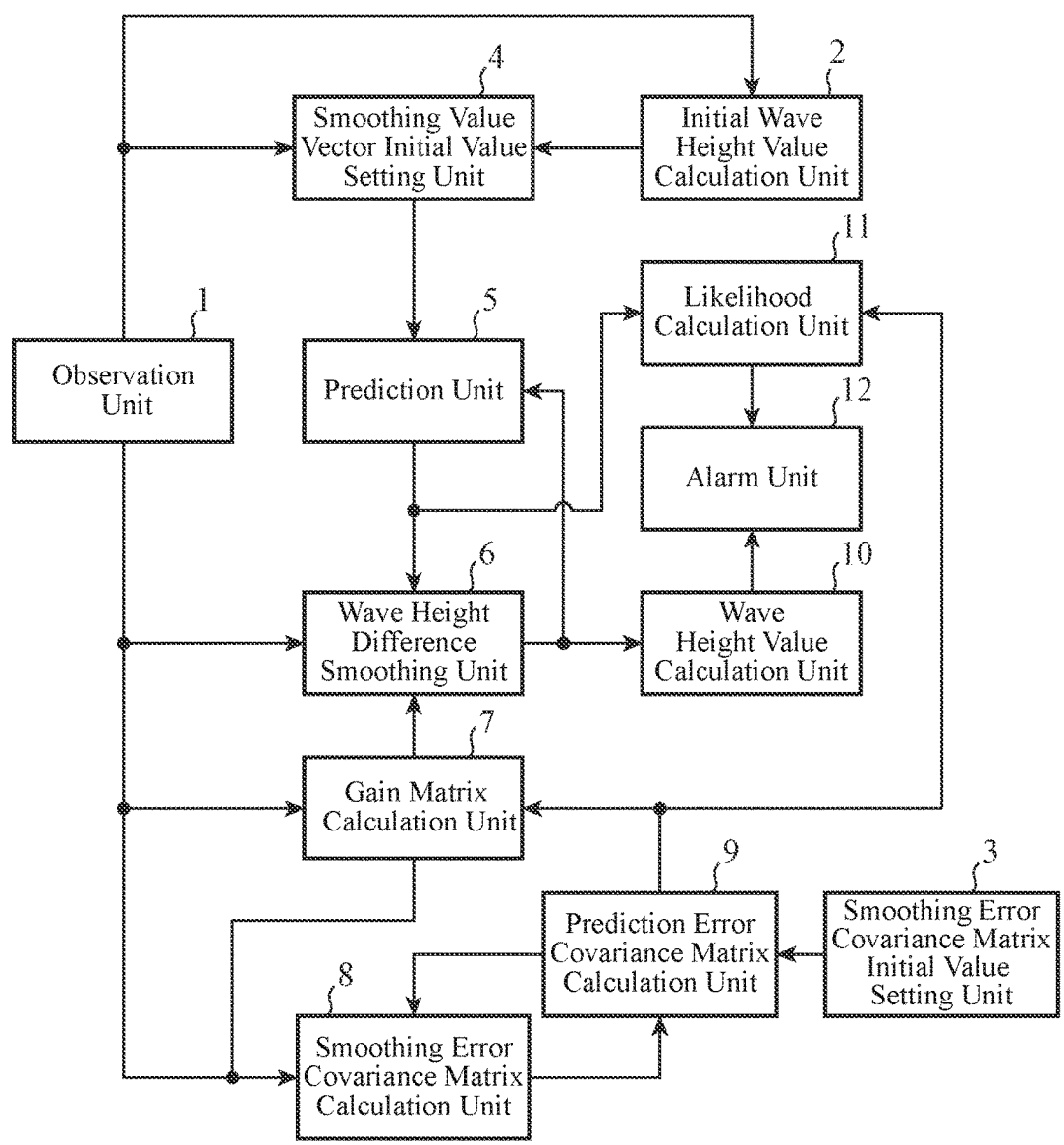
FIG. 1 is a diagram illustrating a configuration of a state estimation device according to a first embodiment of the present invention.

FIG. 1 is a diagram illustrating a configuration of a state estimation device according to a first embodiment of the present invention.

As illustrated in FIG. 1, the state estimation device includes an observation unit 1, an initial wave height value calculation unit 2, a smoothing error covariance matrix initial value setting unit 3, a smoothing value vector initial value setting unit 4, a prediction unit 5, a wave height difference smoothing unit 6, a gain matrix calculation unit 7, a smoothing error covariance matrix calculation unit 8, a prediction error covariance matrix calculation unit 9, a wave height value calculation unit 10, a likelihood calculation unit 11, and an alarm unit 12. Each of the above functional units of the state estimation device is executed by program processing using a central processing unit (CPU) based on software.

The observation unit 1 measures a flow velocity value of a sea surface and a coastal wave height value. Here, the observation unit 1 measures the flow velocity value of the sea surface using a beam of a radar, on a cell-basis, and measures the coastal wave height value using a tide gauge installed at a coast. Here, the cell refers to a unit of distance and beam resolution. Information indicating observation values (the flow velocity value and the wave height value) measured by the observation unit 1 is output to the initial wave height value calculation unit 2, the smoothing value vector initial value setting unit 4, the wave height difference smoothing unit 6, the gain matrix calculation unit 7, and the smoothing error covariance matrix calculation unit 8.

The initial wave height value calculation unit 2 calculates an initial value of a wave height difference of a target (sea surface) state vector. At this time, the initial wave height value calculation unit 2 calculates, based on the flow velocity value measured by the observation unit 1, for each range cell, an initial value of a wave height difference of the state vector from a difference between flow velocity values at 2 times that correspond to a flow velocity value at an initial time and a flow velocity value at a next time. Information indicating the wave height difference calculated by the initial wave height value calculation unit 2 is output to the smoothing value vector initial value setting unit 4.

The smoothing error covariance matrix initial value setting unit 3 sets an initial value of a smoothing error covariance matrix at the initial time. Information indicating the smoothing error covariance matrix set by the smoothing error covariance matrix initial value setting unit 3 is output to the prediction error covariance matrix calculation unit 9.

The smoothing value vector initial value setting unit 4 sets the observation values measured by the observation unit 1, and the wave height difference calculated by the initial wave height value calculation unit 2, as initial values of the target state vector. Information indicating the target state vector set by the smoothing value vector initial value setting unit 4 is output to the prediction unit 5.

The prediction unit 5 predicts the target state vector. The prediction unit 5 predicts a target state vector at the next time, for the target state vector set by the smoothing value vector initial value setting unit 4, in an initial phase, and for a target state vector smoothed by the wave height difference smoothing unit 6, in a tracking phase. Information indicating the target state vector predicted by the prediction unit 5 is output to the wave height difference smoothing unit 6 and the likelihood calculation unit 11.

The wave height difference smoothing unit 6 smooths a target state vector for each wave height difference, based on the target state vector predicted by the prediction unit 5, the observation values measured by the observation unit 1, and a gain matrix calculated by the gain matrix calculation unit 7. Information indicating the target state vector smoothed by the wave height difference smoothing unit 6 is output to the prediction unit 5 and the wave height value calculation unit 10.

The gain matrix calculation unit 7 calculates a gain matrix from the observation values measured by the observation unit 1, and a prediction error covariance matrix calculated by the prediction error covariance matrix calculation unit 9. Information indicating the gain matrix calculated by the gain matrix calculation unit 7 is output to the wave height difference smoothing unit 6 and the smoothing error covariance matrix calculation unit 8.

The smoothing error covariance matrix calculation unit 8 calculates a smoothing error covariance matrix from the observation values measured by the observation unit 1, the gain matrix calculated by the gain matrix calculation unit 7, and the prediction error covariance matrix calculated by the prediction error covariance matrix calculation unit 9. Information indicating the smoothing error covariance matrix calculated by the smoothing error covariance matrix calculation unit 8 is output to the prediction error covariance matrix calculation unit 9.

The prediction error covariance matrix calculation unit 9 calculates a prediction error covariance matrix. The prediction error covariance matrix calculation unit 9 calculates the prediction error covariance matrix, using the smoothing error covariance matrix calculated by the smoothing error covariance matrix initial value setting unit 3, in an initialization phase, and using the smoothing error covariance matrix calculated by the smoothing error covariance matrix calculation unit 8, in the tracking phase. Information indicating the prediction error covariance matrix calculated by the prediction error covariance matrix calculation unit 9 is output to the gain matrix calculation unit 7, the smoothing error covariance matrix calculation unit 8, and the likelihood calculation unit 11.

The wave height value calculation unit 10 calculates a wave height value of each range cell by adding the wave height value and the wave height difference in a toward-offshore direction, based on the target state vector smoothed by the wave height difference smoothing unit 6. Information indicating the wave height value calculated by the wave height value calculation unit 10, and a flow velocity value of the target state vector smoothed at the time is output to the alarm unit 12.

The likelihood calculation unit 11 calculates a likelihood of each beam, from the target state vector predicted by the prediction unit 5, and the prediction error covariance matrix calculated by the prediction error covariance matrix calculation unit 9, and detects a beam direction in which the likelihood becomes the largest, as an arrival direction of tsunami. Information indicating the beam direction detected by the likelihood calculation unit 11 is output to the alarm unit 12.

The alarm unit 12 outputs an alarm of tsunami based on the beam direction detected by the likelihood calculation unit 11, the wave height value calculated by the wave height value calculation unit 10, and a magnitude of the flow velocity value at the time. In addition, the alarm unit 12 predicts an arrival time of tsunami by performing fluid simulation using a motion equation of tsunami, using the wave height value calculated by the wave height value calculation unit 10 and the flow velocity value at the time as initial conditions.

Next, an operation of the state estimation device having the above-described configuration will be described.

The operation of the state estimation device is divided into the initialization phase and the tracking phase. In the initialization phase, an initial value of a Kalman filter is set by executing initial value setting of the target state vector, and initial value setting of the smoothing error covariance matrix in a state in which observation values (flow velocity values, wave height values) corresponding to 2 times have been accumulated. In addition, in the tracking phase, similarly to a normal Kalman filter, update of the state vector is executed on-line for each time.

Figure 2:
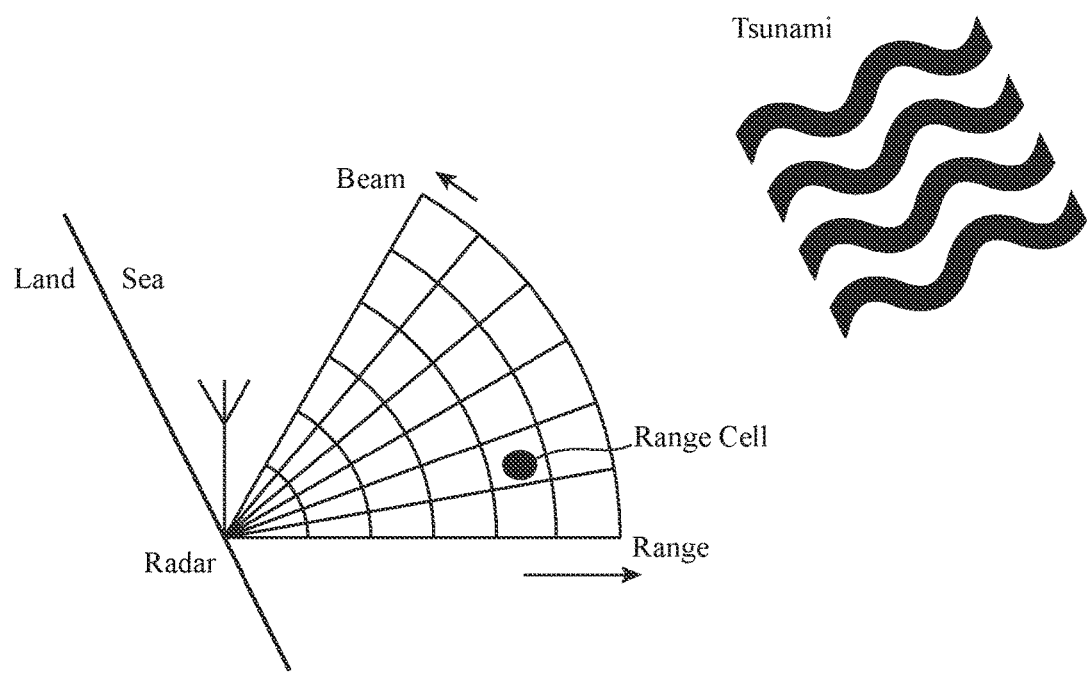
FIG. 2 is a diagram illustrating states of a radar and tsunami in the state estimation device according to the first embodiment of the present invention.

In the operation of the state estimation device, first, the observation unit 1 measures a flow velocity value of a sea surface using a beam, and measures a coastal wave height value. FIG. 2 is a diagram illustrating the measurement of a flow velocity value of a sea surface using a radar.

Subsequently, the initial wave height value calculation unit 2 calculates an initial value of a wave height difference of a target state vector based on the flow velocity value measured by the observation unit 1.

Figure 3:
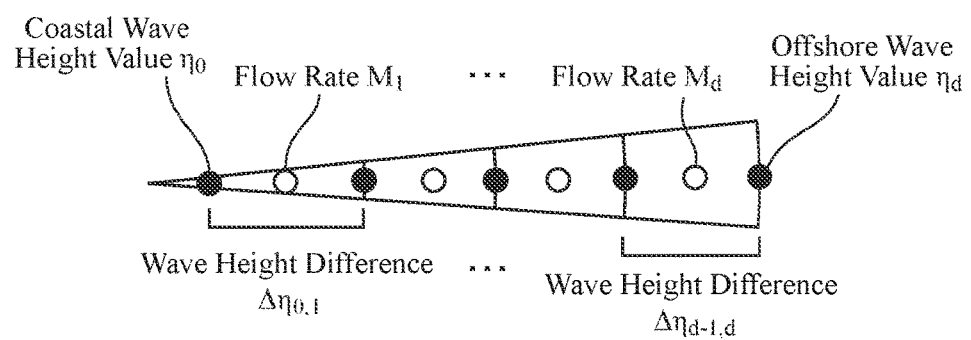
FIG. 3 is a diagram illustrating a radar coverage area and a state vector in the state estimation device according to the first embodiment of the present invention.

Here, a flow velocity component only in an eye gaze detection can be detected using a flow velocity value obtained by a single radar. Thus, a Kalman filter taking the mutual interaction of waves in the range direction into consideration is formed for each beam. Thus, as illustrated in FIG. 3 and the following formula (1), the Kalman filter is executed for each beam, using a flow velocity value (flow rate) in each range cell from a coast to an offshore, a wave height difference in a spatial direction between neighboring range cells over a boundary thereof, and a coastal wave height value, as a target state vector.

$$X(k) = \begin{pmatrix} M_1(k) \\ M_2(k) \\ \vdots \\ M_d(k) \\ \eta_0(k) \\ \Delta\eta_{0,1}(k) \\ \vdots \\ \Delta\eta_{d-1,d}(k) \end{pmatrix} \quad (1)$$

In Formula (1), X(k) denotes a target state vector at a time k, $M_i$ (k) denotes a flow rate of an i-th range cell at the time k, $\eta_0$ (k) denotes a coastal wave height value, and $\Delta\eta_{i-1,i}$ (k) denotes a wave height difference of the i-th range cell.

In the following processing, processing of the Kalman filter that is performed in a case in which a beam is fixed will be described. However, it is actually assumed to concurrently execute Kalman filters corresponding to the number of beams.

Then, the initial wave height value calculation unit 2 uses flow velocity values at 2 times that correspond to a flow velocity value at the initial time and a flow velocity value at the next time, as inputs, and calculates, for each range cell, an initial value of a wave height difference of a state vector from a difference between the flow velocity values at the initial time and the next time, using the following formulae (2) and (3).

$$\Delta\eta_{i-1,i}(k) = \frac{\Delta x}{gh\Delta t}(M_i(k+1) - M_i(k)) \quad (2)$$

$$M_i(k) = hu_i(k) \quad (3)$$

In Formulae (2) and (3), $u_i$ denotes a flow velocity of the i-th range cell, t denotes a time, h denotes a water depth, d denotes the number of range cells, g denotes a gravitational acceleration, $\Delta x$ denotes a distance between range cells, and $\Delta t$ denotes a sampling interval. In addition, the water depth h is assumed to be known from topography data or the like.

Subsequently, the smoothing error covariance matrix initial value setting unit 3 sets a smoothing error covariance matrix at the initial time, using the following formulae (4) to (7).

$$P_{2:2} = \begin{pmatrix} R & \frac{\Delta x}{g\Delta t}R \\ \frac{\Delta x}{g\Delta t}R & 2\left(\frac{\Delta x}{g\Delta t}\right)^2 R + \left(G_v - \frac{\Delta x}{g\Delta t}G_e\right)Q\left(G_v - \frac{\Delta x}{g\Delta t}G_e\right)' \end{pmatrix} \quad (4)$$

$$G = \begin{pmatrix} G_v \\ 0\ 0\ \ldots\ 0 \\ G_e \end{pmatrix} \quad (5)$$

$$G_v = (\Delta t/(-gh\Delta x))I_d \quad (6)$$

$$G_e = I_d \quad (7)$$

In Formula (4), $P_{k:k}$ denotes a smoothing error covariance matrix at the time k, R denotes an observation error covariance matrix, Q denotes a drive noise covariance matrix, G denotes a drive noise conversion matrix represented by Formulae (5) to (7), and Id denotes a unit matrix in the size of d*d. Here, in Formulae (5) to (7), a wave height difference is assumed to fluctuate according to a normal distribution when tsunami moves. However, formulation may be performed assuming that a time derivative of a wave height difference fluctuates according to the normal distribution.

Subsequently, the smoothing value vector initial value setting unit 4 sets the observation values measured by the observation unit 1, and the wave height difference calculated by the initial wave height value calculation unit 2, as initial values of the target state vector.

Subsequently, the prediction unit 5 predicts the target state vector. At this time, the prediction unit 5 predicts a target state vector at the next time using the following formulae (8) to (10), for the target state vector set by the smoothing value vector initial value setting unit 4, in the initial phase, and for the target state vector smoothed by the wave height difference smoothing unit 6, in the tracking phase.

$$X_{k:k-1} = AX_{k-1:k-1} \qquad (8)$$

$$A = \begin{pmatrix} 1 & 0 & 0 & \cdots & 0 & C & 0 & 0 & \cdots \\ 0 & 1 & 0 & \cdots & 0 & 0 & C & 0 & \cdots \\ \vdots & & \ddots & & & \vdots & & \ddots & \\ -\frac{\Delta t}{\Delta x} & 0 & 0 & \cdots & 1 & 0 & 0 & 0 & \cdots \\ 2\frac{\Delta t}{\Delta x} & -\frac{\Delta t}{\Delta x} & 0 & \cdots & 0 & 1 & 0 & 0 & \cdots \\ -\frac{\Delta t}{\Delta x} & 2\frac{\Delta t}{\Delta x} & -\frac{\Delta t}{\Delta x} & \cdots & 0 & 0 & 1 & 0 & \cdots \\ 0 & -\frac{\Delta t}{\Delta x} & 2\frac{\Delta t}{\Delta x} & -\frac{\Delta t}{\Delta x} & \cdots & 0 & 0 & 1 & \cdots \\ \vdots & & \ddots & & & & & & \\ 0 & 0 & 0 & 0 \cdots \frac{\Delta t}{\Delta x} & D-\frac{\Delta t}{\Delta x} & D & \cdots D & D & D & \cdots \end{pmatrix} \qquad (9)$$

$$C = -gh\frac{\Delta t}{\Delta x}, D = \sqrt{g/h} \qquad (10)$$

In Formula (8), $X_{k:k-1}$ denotes a predicted state vector at the time k. In addition, a transition matrix A in the size of (2d+1)*(2d+1) indicating a kinetic model is represented by Formulae (9) and (10).

The details of the transition matrix A will be described below.

First, using a one-dimensional linear shallow water equation, a relationship between a flow velocity value and a wave height difference can be represented by the following formulae (11) and (12).

$$M_i(k+1) = M_i(k) - gh\frac{\Delta t}{\Delta x}(\eta_{i+1}(k) - \eta_i(k)) \qquad (11)$$

$$\Delta\eta_{i,i+1}(k+1) = \Delta\eta_{i,i+1}(k) - \frac{\Delta t}{\Delta x}(M_{i+2}(k) - 2M_{i+1} + M_i(k)) \qquad (12)$$

According to this, by assembling the one-dimensional linear shallow water equations of the respective range cells into a matrix as a kinetic model with taking the Relational Expression (13) related to a boundary condition into consideration, the transition matrix A indicating the kinetic model can be represented by Formulae (9) and (10). Although in the above description, the kinetic model is derived from the one-dimensional linear shallow water equations, the smoothing may be performed with a nonlinear filter such as an extended Kalman filter, a particle filter, or the like, using a shallow water equation with which a nonlinear term is taken into consideration. In addition, because it is known that the one-dimensional linear shallow water equation includes a large error at a point where a water depth is shallow, drive noise may be set in accordance with the water depth in a measurement area of the observation unit 1.

$$M_{d+1}(k+1) = \left(\eta_0(k) + \sum_{l}^{d} \Delta\eta_{d-1,d}(k) - \frac{\Delta t}{\Delta x}(M_d(k) - M_{d-1}(k))\right)\sqrt{g/h}, \qquad (13)$$

$$M_0(k) = 0$$

Subsequently, the wave height difference smoothing unit 6 smooths a target state vector for each wave height difference, using the following formulae (14) and (15), based on the target state vector predicted by the prediction unit 5, the observation values measured by the observation unit 1, and the gain matrix calculated by the gain matrix calculation unit 7.

$$X_{k:k} = X_{k:k-1} + K(k)(Z(k) - HX_{k:k-1}) \qquad (14)$$

$$H = \begin{pmatrix} \frac{1}{h} & 0 & & 0 & 0 & \cdots & 0 \\ 0 & \frac{1}{h} & & 0 & 0 & \cdots & 0 \\ \vdots & & \ddots & & & \vdots & \\ 0 & 0 & \cdots & \frac{1}{h} & 0 & \cdots & 0 \\ 0 & 0 & \cdots & 0 & 1 & \cdots & 0 \end{pmatrix} \qquad (15)$$

In Formula (14), $X_{k:k}$ denotes a smoothed state vector at the time k, H denotes an observation matrix in the size of d*(2d+1) represented by Formula (15) from the relationship between a flow rate and a flow velocity, and Z(k) denotes an observation value vector of a coastal wave height value and flow velocity value.

Subsequently, the gain matrix calculation unit 7 calculates a gain matrix using the following formula (16), from the observation values measured by the observation unit 1, and the prediction error covariance matrix calculated by the prediction error covariance matrix calculation unit 9.

$$K(k) = P_{k:k-1}(k)H^t[HP_{k:k-1}H^t + R] \qquad (16)$$

In Formula (16), $H^t$ denotes transposition of the matrix H.

Subsequently, the smoothing error covariance matrix calculation unit 8 calculates a smoothing error covariance matrix using the following formula (17), from the observation values measured by the observation unit 1, the gain matrix calculated by the gain matrix calculation unit 7, and the prediction error covariance matrix calculated by the prediction error covariance matrix calculation unit 9.

$$P_{k:k} = (I - K(k)H) P_{k:k-1} \quad (17)$$

Subsequently, the prediction error covariance matrix calculation unit 9 calculates a prediction error covariance matrix using the following formula (18). At this time, the prediction error covariance matrix calculation unit 9 calculates the prediction error covariance matrix, using the smoothing error covariance matrix calculated by the smoothing error covariance matrix initial value setting unit 3, in the initialization phase, and using the smoothing error covariance matrix calculated by the smoothing error covariance matrix calculation unit 8, in the tracking phase.

$$P_{k:k-1} = A P_{k-1:k-1} A^t + GQG^t \quad (18)$$

In Formula (18), $P_{k:k-1}$ denotes a prediction error covariance matrix at a time $k-1$.

Figure 4:
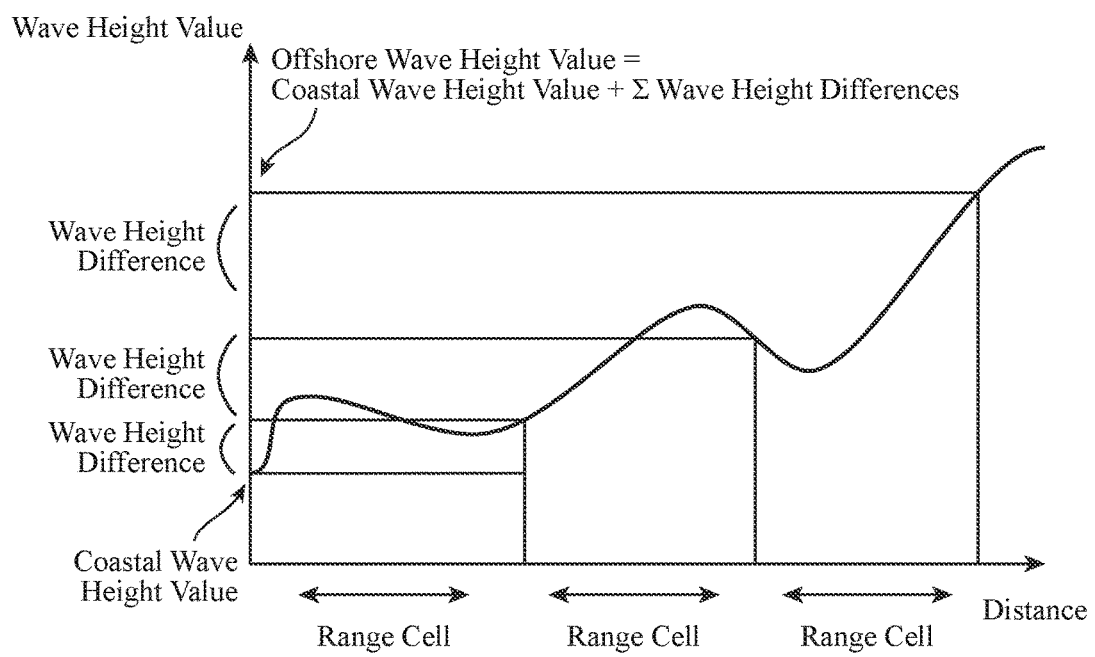
FIG. 4 is a diagram illustrating a relationship between a distance and a wave height difference in the state estimation device according to the first embodiment of the present invention.

Subsequently, the wave height value calculation unit 10 calculates a wave height value of each range cell by adding the wave height value and the wave height difference in the toward-offshore direction, using the following formula (19), based on the target state vector smoothed by the wave height difference smoothing unit 6 (refer to FIG. 4).

$$\eta_d(k) = \eta_0(k) + \sum_{l}^{d} \Delta \eta_{d-1,d}(k) \quad (19)$$

Subsequently, the likelihood calculation unit 11 calculates a likelihood of each beam, using the following formulae (20) and (21), from the target state vector predicted by the prediction unit 5, and the prediction error covariance matrix calculated by the prediction error covariance matrix calculation unit 9, and detects a beam direction in which the likelihood becomes the largest, as an arrival direction of tsunami.

$$p(Z_k) \quad (20)$$

$$p \sim N(HX_{k:k-1}, R + HP_{k:k-1} H^t) \quad (21)$$

In Formula (20), P denotes a probability density function, and has a normal distribution represented by Formula (21). Here, in Formula (21), N(A, b) denotes a normal distribution of an average A and a variance b.

Subsequently, the alarm unit 12 outputs an alarm of tsunami, based on the beam direction detected by the likelihood calculation unit 11, the wave height value calculated by the wave height value calculation unit 10, and the magnitude of the flow velocity value at the time. In addition, the alarm unit 12 predicts an arrival time of tsunami by performing fluid simulation using a motion equation of tsunami, using the wave height value calculated by the wave height value calculation unit 10 and the flow velocity value at the time, as initial conditions.

As described above, according to the first embodiment, wave height values are resolved into wave height differences in a spatial direction, and a flow velocity value (flow rate), a coastal wave height value, and a wave height difference are smoothed in a time-series direction as a target state vector, and then, the smoothed wave height value and wave height difference are added in the toward-offshore direction. According to such a configuration, it is possible to recognize an accurate wave height value and an accurate flow velocity value of tsunami in real time.

In Non-Patent Literature 2 in which a wave height value is represented as a state vector, in a case of estimating an offshore wave height value, a flow velocity value can be observed, but a wave height value other than a coastal wave height value cannot be directly obtained, so that a wave height value cannot be accurately estimated.

Figure 5:
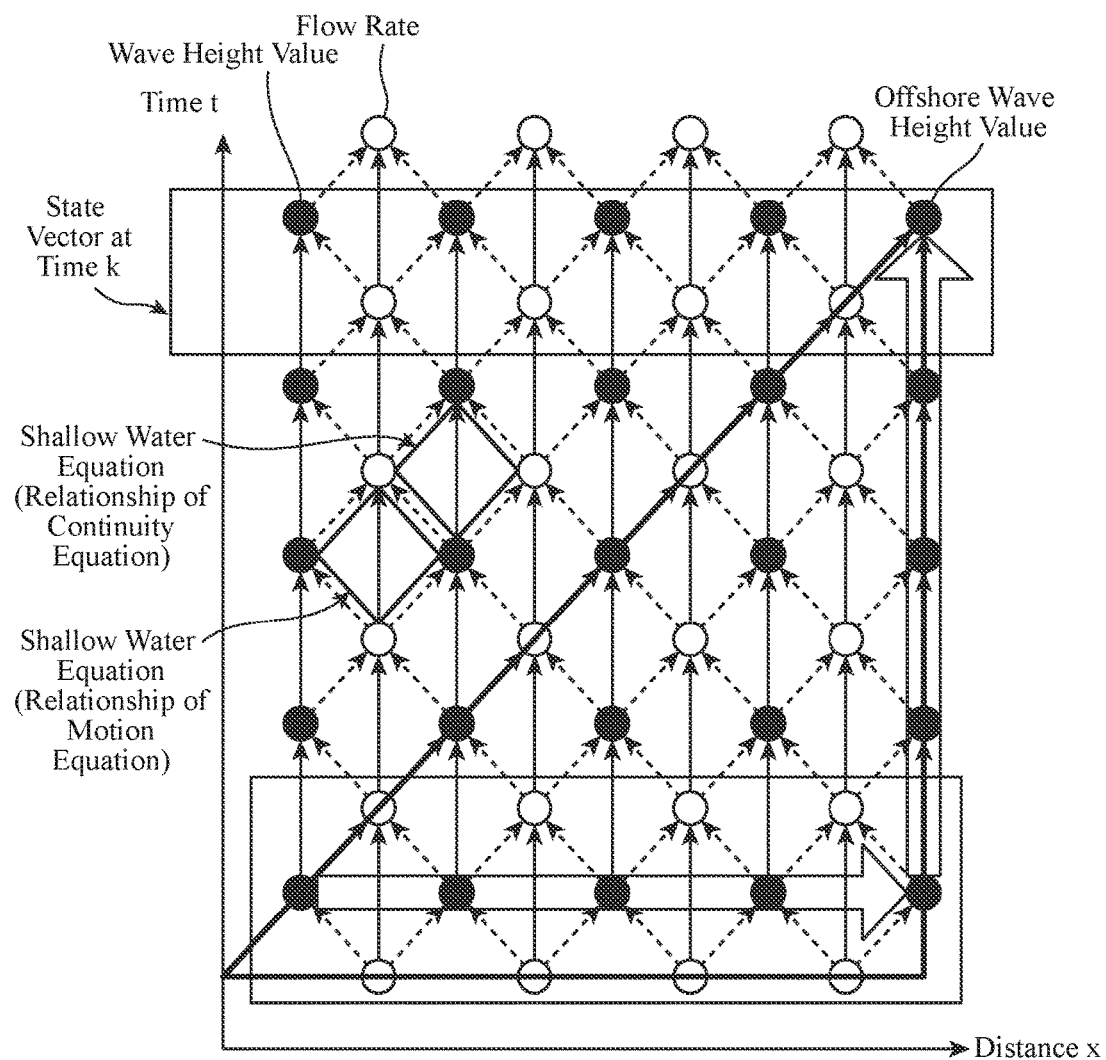
FIG. 5 is a diagram illustrating a smoothing processing in a conventional state estimation device.

FIG. 5 is a diagram illustrating a state of propagation of flow rates (flow velocity values) and wave height values, and a concept of smoothing of an offshore wave height value in a conventional method. In FIG. 5, arrows in a rhombus formed by wave height values and flow rates indicate the state of propagation of wave height values and flow rates based on a one-dimensional shallow water equation.

In a conventional method, as an initial value of the Kalman filter, an initial wave height value is calculated using Formulae (2) and (19) and is smoothed using surrounding flow rates. Thus, the influence of an error of the initial wave height value is large. Even if smoothing in time-series direction is executed, the estimation accuracy of wave height values is not improved. In addition to this, flow rates used for smoothing an offshore wave height value are limited to flow rates in a triangle area in FIG. 5. Thus, the estimation accuracy of wave height values deteriorates.

In contrast, in the present invention, wave height values are resolved into wave height differences in the spatial direction, smoothing is performed for each wave height difference, and a wave height value is obtained by addition processing of wave height differences in the spatial direction. With this configuration, even if the estimation accuracy of an initial wave height value is bad, a wave height difference is smoothed each time the time progresses, so that a wave height value can be accurately estimated.

Figure 6:
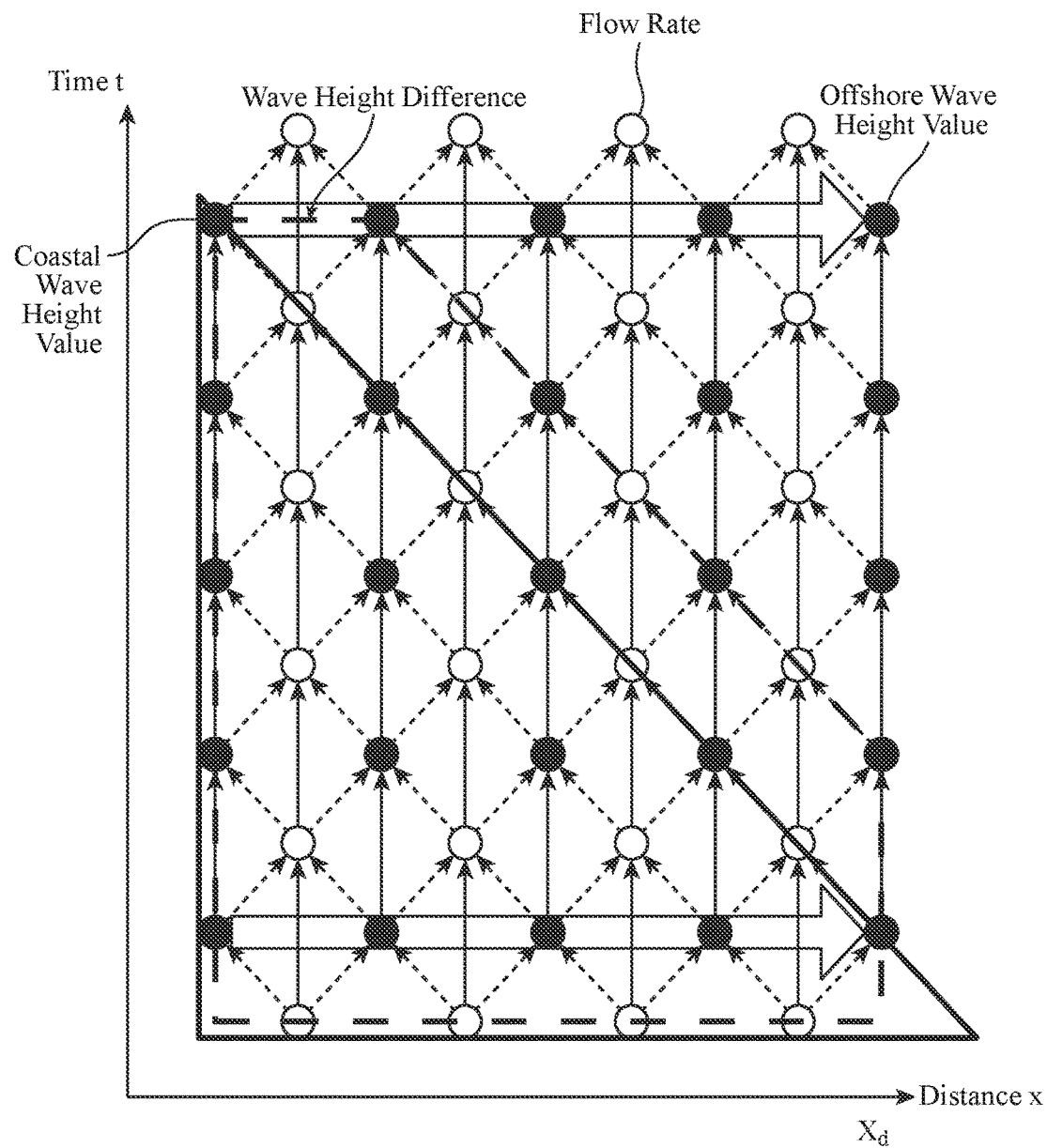
FIG. 6 is a diagram illustrating a smoothing processing in the state estimation device according to the first embodiment of the present invention.

FIG. 6 is a diagram illustrating a concept of smoothing of wave height differences in the present invention.

As illustrated in FIG. 6, flow rates (flow velocity values) used for smoothing a wave height difference nearest to a coastal wave height value are flow rates in broken lines in FIG. 6. In addition, an offshore wave height value is represented by adding wave height differences. Thus, the number of flow rates used in the calculation of the offshore wave height value corresponds to the number of flow rates at the past all times in all range cells. As a result, the estimation accuracy of wave height values is expected to be improved more than the conventional method.

Note that, in the present invention, any constituent element in the embodiment can be modified, or any constituent element in the embodiment can be omitted, within the scope of the invention.

INDUSTRIAL APPLICABILITY

The state estimation device according to the present invention can identify an accurate wave height value and an accurate flow velocity value of tsunami in real time, and is suitable for being used in a state estimation device or the like that performs state estimation of a sea surface.

REFERENCE SIGNS LIST

1: observation unit, 2: initial wave height value calculation unit, 3: smoothing error covariance matrix initial value setting unit, 4: smoothing value vector initial value setting unit. 5: prediction unit, 6: wave height difference smoothing unit. 7: gain matrix calculation unit. 8: smoothing error covariance matrix calculation unit, 9: prediction error covariance matrix calculation unit, 10: wave height value calculation unit, 11: likelihood calculation unit, 12: alarm unit

The invention claimed is:

1. A state estimation device comprising:
a radar emitting a radar beam having range cells;
an observer measuring a flow velocity value of a sea surface using the radar beam, and measuring a coastal wave height value;
a predictor predicting, for a state vector including flow velocity value of each of the range cells of the radar beam, a wave height difference between the range cells over a boundary thereof, and the coastal wave height value, the state vector at a next time;
a prediction error covariance matrix calculator calculating a prediction error covariance matrix from a smoothing error covariance matrix initial value;
a gain matrix calculator calculating a gain matrix from processing results obtained by the observer and the prediction error covariance matrix calculator;
a smoothing error covariance matrix calculator calculating a smoothing error covariance matrix at a next time from processing results obtained by the observer and the gain matrix calculator, and the prediction error covariance matrix at a present time predicted by the prediction error covariance matrix calculator;
a wave height difference smoother smoothing the state vector for each wave height difference, from processing results obtained by the observer, the predictor, and the gain matrix calculator; and
a wave height value calculator calculating a wave height value of each of the range cells by adding the wave height value and the wave height difference in a toward-offshore direction, using a processing result obtained by the wave height difference smoother.

2. The state estimation device according to claim 1, wherein the predictor predicts the state vector at the next time, using a kinetic model based on a shallow water equation including a relationship between the flow velocity value and the wave height difference.

3. The state estimation device according to claim 2, wherein the predictor sets a magnitude of drive noise in accordance with a water depth in a measurement area of the observer, in the kinetic model based on the shallow water equation.

4. The state estimation device according to claim 1, further comprising a likelihood calculator calculating a likelihood of each of a plurality of radar beams from processing results obtained by the predictor and the prediction error covariance matrix calculator, and detecting a radar beam direction in which the likelihood is high, as an arrival direction of tsunami.

5. The state estimation device according to claim 4, further comprising an alarm predicting an arrival time of tsunami from the radar beam direction detected by the likelihood calculator, the wave height value calculated by the wave height value calculator, and the flow velocity value of the state vector smoothed by the wave height difference smoother.

6. The state estimation device according to claim 1, further comprising an initial wave height value calculator calculating, based on the flow velocity value measured by the observer, for each of the range cells, an initial value of a wave height difference in the state vector, from a difference between flow velocity values at 2 times that correspond to the flow velocity value at an initial time and the flow velocity value at a next time,
wherein the predictor predicts, in an initial phase, from a state vector including the flow velocity value and the coastal wave height value of each of the range cells that are observed by the observer, and a wave height difference between the range cells over the boundary thereof that is calculated by the initial wave height value calculator, the state vector at the next time.

7. The state estimation device according to claim 1, wherein the predictor predicts the state vector at the next time, using a kinetic model based on a nonlinear shallow water equation including a relationship between the flow velocity value and the wave height difference.

* * * * *